(12) United States Patent
Shore

(10) Patent No.: US 8,124,261 B2
(45) Date of Patent: Feb. 28, 2012

(54) PROCESS FOR RECYCLING COMPONENTS OF A PEM FUEL CELL MEMBRANE ELECTRODE ASSEMBLY

(75) Inventor: Lawrence Shore, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 1085 days.

(21) Appl. No.: 11/471,324

(22) Filed: Jun. 20, 2006

(65) Prior Publication Data

US 2007/0292745 A1 Dec. 20, 2007

(51) Int. Cl.
*H01M 8/10* (2006.01)
*C01J 5/22* (2006.01)

(52) U.S. Cl. .............................. 429/49; 429/483; 521/26

(58) Field of Classification Search .................. 429/30, 429/49, 483; 29/403.1; 521/26
See application file for complete search history.

(56) References Cited

U.S. PATENT DOCUMENTS

| | | | |
|---|---|---|---|
| 4,433,082 A | | 2/1984 | Grot |
| 4,731,263 A | | 3/1988 | Martin et al. |
| 5,133,843 A | * | 7/1992 | Eisman ........................ 521/26 X |
| 5,234,777 A | | 8/1993 | Wilson |
| 5,501,915 A | | 3/1996 | Hards et al. |
| 5,561,000 A | | 10/1996 | Dirven et al. |
| 5,702,755 A | | 12/1997 | Mussell |
| 5,718,984 A | * | 2/1998 | Iwase et al. ...................... 429/49 |
| 5,859,416 A | | 1/1999 | Gatto |
| 6,083,638 A | | 7/2000 | Taniguchi et al. |
| 6,150,426 A | | 11/2000 | Curtin et al. |
| 6,602,630 B1 | | 8/2003 | Gopal |
| 6,610,436 B1 | | 8/2003 | Dearnaley et al. |
| 6,720,104 B2 | | 4/2004 | Zuber et al. |
| 6,733,915 B2 | | 5/2004 | Barton et al. |
| 2005/0211630 A1 | | 9/2005 | Grot et al. |
| 2006/0147791 A1 | | 7/2006 | Debe et al. |
| 2006/0237034 A1 | * | 10/2006 | Shore et al. ...................... 134/10 |
| 2006/0275652 A1 | * | 12/2006 | Hageluken et al. ............. 429/49 |

FOREIGN PATENT DOCUMENTS

| | | |
|---|---|---|
| EP | 1 063 717 | 12/2000 |
| EP | 1 065 742 | 3/2001 |
| JP | 2005-235504 | 9/2005 |
| JP | 2005-235511 | 9/2005 |
| JP | 2005-289001 | 10/2005 |

OTHER PUBLICATIONS

"A Nafion® -bound platinized carbon electrode for oxygen reduction in solid polymer electrolyte cells," Shukla et al., Journal of Applied Electrochemistry, vol. 19 (2002), pp. 383-386.

"Recycling and regeneration of used perfluorosulfonic membranes for polymer electrode fuel cells," H-F. Xu, et al., Journal of Applied Electrochemistry, vol. 32 (2002), pp. 1337-1340.

(Continued)

*Primary Examiner* — Stephen J. Kalafut
(74) *Attorney, Agent, or Firm* — Bernard Lau

(57) ABSTRACT

The membrane electrode assembly (MEA) of a PEM fuel cell can be recycled by contacting the MEA with a lower alkyl alcohol solvent which separates the membrane from the anode and cathode layers of the assembly. The resulting solution containing both the polymer membrane and supported noble metal catalysts can be heated under mild conditions to disperse the polymer membrane as particles and the supported noble metal catalysts and polymer membrane particles separated by known filtration means.

20 Claims, 1 Drawing Sheet

OTHER PUBLICATIONS

"PEM fuel cell stack development based on membrane-electrode assemblies of ultra-low platinum loadings," Zawodzinski et al., Electrochemical Society Proceedings, vol. 95-23, pp. 57-65.

"Thin-film catalyst layers for polymer electrolyte fuel cell electrodes," Wilson et al., Journal of Applied Electrochemistry, vol. 22 (1992), pp. 1-7.

English language Abstract for JP 2004171921, Naoko, "Method of Collecting Catalyst Metal and Fluorine Containing Polymers having Sulfonic Acid Group from Fuel Cell," Pub. Date: Jun. 17, 2004, from Delphion.

English language Abstract for JP 11288732, Nobuhito et al., "Method for Recovering and Reusing Material for Solid High Polymer Fuel Cell," Pub. Date: Oct. 19, 1999, from Delphion.

English language translation of JP 11288732, Nobuhito et al., "Method for Recovering and Reusing Material for Solid High Polymer Fuel Cell," Pub. Date: Nov. 19, 1999, 17 pages.

English language translation of JP 2004171921, Naoko, "Method of Collecting Catalyst Metal and Fluorine Containing Polymers having Sulfonic Acid Group from Fuel Cell," Pub. Date: Jun. 17, 2004, 44 pages.

U.S. Appl. No. 11/110,406, entitled Process for Recycling Components of a PEM Fuel Cell Membrane Electrode Assembly, filed Apr. 20, 2005.

International Search Report dated Nov. 20, 2007 for PCT/US2007/071642 filed on Jun. 20, 2007.

International Preliminary Report dated Dec. 22, 2008 on Patentability for PCT/US2007/071642 filed Jun. 20, 2007.

Examination Report dated Sep. 14, 2010 in EP Application No. 07 784 488.4 filed Jun. 20, 2007.

Office Action dated Mar. 31, 2011 in Chinese Patent Application No. 200780030918.9 filed Jun. 20, 2007.

* cited by examiner

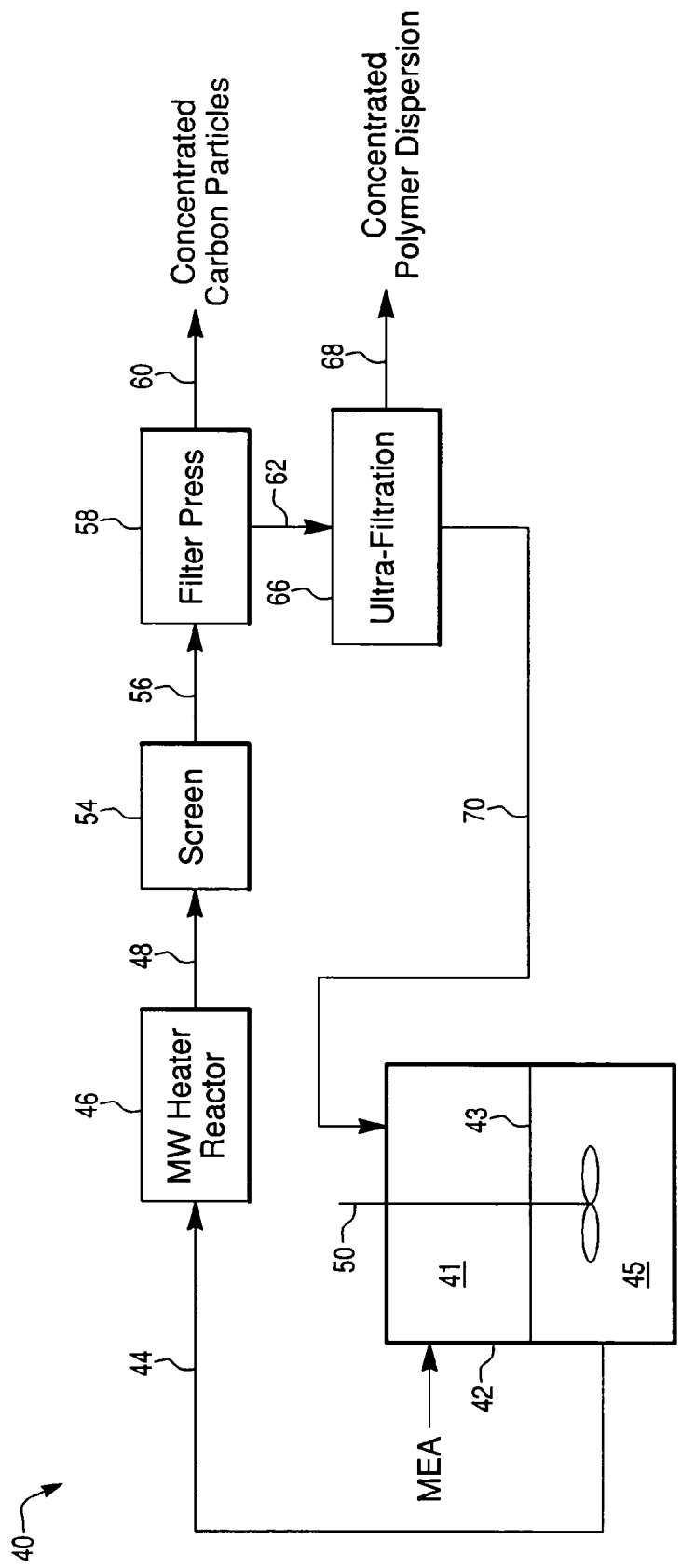

PROCESS FOR RECYCLING COMPONENTS OF A PEM FUEL CELL MEMBRANE ELECTRODE ASSEMBLY

This invention was made with Government support under Cooperative Agreement No. DE-FC36-03GO13104 awarded by the United States Department of Energy. The Government has certain rights in the invention.

FIELD OF THE INVENTION

The present invention is directed to a process for recycling components of a PEM fuel cell membrane electrode assembly.

BACKGROUND OF THE INVENTION

Fuel cells convert a fuel and an oxidizing agent, which are locally separated from one another at two electrodes, into electricity, heat and water. Hydrogen or a hydrogen-rich gas can be used as the fuel, oxygen or air as the oxidizing agent. The process of energy conversion in the fuel cell is characterized by a particularly high efficiency. The compact design, power density, and high efficiency of polymer electrolyte membrane fuel cells (PEM fuel cells) make them suitable for use as energy converters, and for these reasons PEM fuel cells in combination with electric motors are gaining growing importance as an alternative to conventional combustion engines.

The hydrogen/oxygen type fuel cell relies on anodic and cathodic reactions which lead to the generation and flow of electrons and electrical energy as a useful power source for many applications. The anodic and cathodic reactions in a hydrogen/oxygen fuel cell may be represented as follows:

$$H_2 \rightarrow 2H^+ + 2e^- \quad \text{(Anode)}$$

$$\tfrac{1}{2}O_2 + 2e^- \rightarrow H_2O \quad \text{(Cathode)}$$

Each PEM fuel cell unit contains a membrane electrode assembly positioned between bipolar plates, also known as separator plates, which serve to supply gas and conduct electricity. A membrane electrode assembly (MEA) consists of a polymer electrolyte membrane, both sides of which are provided with reaction layers, the electrodes. One of the reaction layers takes the form of an anode for oxidizing hydrogen and the second reaction layer that of a cathode for reducing oxygen. Gas distribution layers made from carbon fiber paper or carbon fiber fabric or cloth, which allow good access of the reaction gases to the electrodes and good conduction of the electrical current from the cell, are attached to the electrodes. The anode and cathode contain electrocatalysts, which provide catalytic support to the particular reaction (oxidation of hydrogen and reduction of oxygen respectively). The metals in the platinum group of the periodic system of elements are preferably used as catalytically active components. Support catalysts are used in which the catalytically active platinum group metals have been applied in highly dispersed form to the surface of a conductive support material. The average crystallite size of the platinum group metals is between around 1 and 10 nm. Fine-particle carbon blacks have proven to be effective as support materials. The polymer electrolyte membrane consists of proton conducting polymer materials. These materials are also referred to below as ionomers. A tetrafluroethylene-flurovinyl ether copolymer with acid functions, particularly sulfuric acid groups, is preferably used. A material of this type is sold under the trade name Nafion® by E.I. DuPont, for example. Other ionomer materials, particularly fluorine-free examples such as sulfonated polyether ketones or aryl ketones or polybenzimidazoles, can also be used, however.

Fuel cells have been pursued as a source of power for transportation because of their high energy efficiency (unmatched by heat engine cycles), their potential for fuel flexibility, and their extremely low emissions. Fuel cells have potential for stationary and vehicular power applications; however, the commercial viability of fuel cells for power generation in stationary and transportation applications depends upon solving a number of manufacturing, cost, and durability problems.

One of the most important problems is the cost of the proton exchange catalyst for the fuel cell. The most efficient catalysts for low temperature fuel cells are noble metals, such as platinum, which are very expensive. Some have estimated that the total cost of such catalysts is approximately 80% of the total cost of manufacturing a low-temperature fuel cell.

In a typical process, an amount of a desired noble metal catalyst of from about 0.5-4 mg/cm² is applied to a fuel cell electrode in the form of an ink, or using complex chemical procedures. Such methods require the application of a relatively large load of noble metal catalyst in order to produce a fuel cell electrode with the desired level of electrocatalytic activity, particularly for low temperature applications. The expense of such catalysts makes it imperative to reduce the amount, or loading, of catalyst required for the fuel cell. This requires an efficient method for applying the catalyst.

In recent years, a number of deposition methods, including rolling/spraying, solution casting/hot pressing, and electrochemical catalyzation, have been developed for the production of Pt catalyst layers for PEM fuel cells.

In the case of hydrogen/oxygen fuel cells, some improvements in catalyst application methods have been directed towards reducing the amount of costly platinum catalyst in formulations. Development of compositions, for example, was achieved by combining solubilized perfluorosulfonate ionomer (Nafion®), support catalyst (Pt on carbon), glycerol and water. This led to the use of low platinum loading electrodes. The following publications teach some of these methods for hydrogen/oxygen fuel cells: U.S. Pat. No. 5,234,777 to Wilson; M. S. Wilson, et al, J. App. Electrochem., 22 (1992) 1-7; C. Zawodzinski, et al, Electrochem. Soc. Proc., Vol. 95-23 (1995) 57-65; A. K. Shukla, et al, J. App. Electrochem., 19(1989) 383-386; U.S. Pat. No. 5,702,755 to Messell; U.S. Pat. No. 5,859,416 to Mussell; U.S. Pat. No. 5,501,915 to Hards, et al.

To reduce dependency on the importation of oil, it has been suggested that the U.S. economy be based on hydrogen as opposed to hydrocarbons. The current atmosphere surrounding the hydrogen economy is supported in part by the success of the PEM fuel cell. As previously said, a primary cost relative to the manufacturer of PEM fuel cells is the noble metal, such as platinum, used as the catalytic electrodes. Importantly, the Nafion® membrane is also a relatively expensive material and contributes to the cost of the fuel cell stack. Typically, the average life of a fuel cell is about one year. Pinholes in the membrane and catalyst deactivation are some causes which reduce the effectiveness and, thus, useful life of the PEM fuel cell.

Recycling of the membrane electrode assembly, which typically contains a core of Nafion® membrane and the platinum/carbon electrodes coated on either side thereof, can address several of the cost issues related to manufacture and use of the PEM fuel cell. First, recovery of the platinum catalyst for reuse is important to meeting the world demand for the metal, and helping to maintain a reasonable price for the metal. Current commercial recovery of platinum from an MEA involves the combustion of the membranes and the processing of the ash. This mechanism is useful because it generates an ash that can be assayed for the purposes of commercial exchange. Unfortunately, there are two disadvantages with this prior process. First, ignition of the fluoropolymeric Nafion® membrane and the PTFE used often in the gas diffusion layers yields HF gas, which is corrosive and hazardous to health. Discharges of HF gas are highly regulated, and even with scrubbing of the gas, furnace throughput is constrained because of residual HF. Secondly, the burning of the Nafion® membrane destroys an expensive, value-added material.

Co-pending U.S. patent application No. 11/110,406 teaches that the Pt/carbon catalyst layers of a membrane electrode assembly can be recycled by contacting the MEA with a lower alkyl alcohol solvent. According to the '406 application lower alkyl alcohols disrupt the bond between the membrane and the attached Pt/carbon catalyst layers allowing for separation of the Pt catalyst layers from the intact membrane.

Methods for dispersing fluorocarbon-containing ionomer polymers are known, which may be adapted to recover the membrane, including those disclosed in U.S. Pat. Nos. 6,150, 426 and 4,433,082. The '426 patent discloses a process for preparing a highly fluorinated ion-exchange polymer by dispersing the polymer under pressure in an aqueous liquid dispersion medium. According to the '426 patent the polymer can be dispersed in a medium consisting essentially of water, under pressure, at preferred temperatures of 150° C. to 350° C. In the '082 patent, a process is provided for making a liquid composition of a perfluorinated polymer by contacting the polymer with a mixture of 25 to 100% by weight of water and 0 to 75% by weight of a second liquid component such as a lower alcohol, e.g., propanol or methanol, at a temperature of at least 180° C. However, these methods tend to be cost prohibitive due to the high pressure and temperature requirements for dispersion of the fluropolymeric membrane.

Alternative processes have been proposed for MEA recycling. These processes do not address the issue of recycling to the extent of the present invention. For example, one process uses a fusion process to recover the precious metal from the MEA. The 3-layer MEA is processed in a flux containing calcium salt. This sequesters the liberated HF as $CaF_2$. However, the value of the MEA membrane is destroyed. Another process dissolves the MEA membrane and proposes to recast the membrane film and re-use the recovered electrode catalysts. Experience has shown that the physical properties of the membrane change during aging. Recasting a film with lower molecular weight polymer may result in a membrane with different properties than one made with virgin polymer.

Accordingly, it would be useful to provide an alternative process for recycling the membrane electrode assembly of a PEM fuel cell whereby the noble metal is recovered in high yield and the Nafion® or other fluoropolymeric membrane is completely recovered for potential recycling. Such a process in which there are no serious environmental issues such as the formation of HF gas can be operated with low-energy utilization, and whereby the process facilitates a commercial exchange based on the assay of the recovered noble metal would aid in promoting the hydrogen economy.

SUMMARY OF THE INVENTION

It has now been found that both the noble metal catalysts and the polymer electrolyte membrane or fluorocarbon-containing ionomer membrane of an MEA can be recycled using a lower alkyl alcohol solution, heating the solution under mild heating conditions and separating the noble metal catalysts from the ionomer membrane by filtration. More specifically, the lower alkyl alcohols, including mixtures of such alcohols with varying amounts of water, can disrupt the bond between the polymer electrolyte membrane or fluorocarbon-containing ionomer membrane and the attached noble metal/carbon catalyst layers to allow separation of the noble metal catalysts from the polymer membrane film. The polymer membrane can then be dispersed as particles in the solution using mild heating conditions, thus allowing for recovery of both the polymer membrane for plastics recycling and the noble metal in the catalytic layer, by filtration, without combustion of the membrane electrode assembly and formation of HF gas.

BRIEF DESCRIPTION OF THE DRAWINGS

FIG. 1—illustrates a proposed process for recycling both the polymer membrane and supported noble metal catalysts of membrane electrode assembly.

DETAILED DESCRIPTION OF THE INVENTION

The present invention is directed to a method of recycling components of a PEM fuel cell membrane electrode assembly without the need to combust the membrane electrode assembly to recover a noble metal-ladened ash and without the need to remove outer layers of the MEA (e.g., gas diffusion-layers). Moreover, the invention is directed to delaminating a PEM fuel cell membrane electrode assembly utilizing lower alcohols or lower alcohol/water mixtures, and thereafter, dispersing the remaining polymer membrane or perfluorocarbon ionomer membrane using mild heating conditions. The method of the present invention is useful for membrane electrode assemblies (MEAs) containing three or more layer (e.g., three-, five-, and seven-layer MEAs) in which a polymer membrane is placed between an anode and cathode, typically formed of a noble metal such as platinum supported on carbon particles.

The structures of the three-, five-, and seven-layer MEAs are well known in the art. The particular methods of making such assemblies are also known and do not form a critical feature of the invention. Methods of manufacture, however, may affect the types of solvents used and the time of treatment.

In the five-layer membrane electrode assemblies, gas diffusion-layers (GDLs) are placed on opposite ends of the respective electrodes. GDLs are typically carbon paper or carbon fiber structures known in the art. Often the GDLs contain a fluorocarbon to impart hydrophobicity. For example, Taniguchi et al, U.S. Pat. No. 6,083,638, discloses a fibrous carbon substrate pre-treated with a fluororesin which is baked at 360° C., followed by treatment with particulate dispersions of hydrophobic and hydrophilic polymer to form discrete channels which are hydrophobic and hydrophilic. Isono et al, EP 1 063 717 A2, discloses a fibrous carbon substrate treated with a high temperature fluoropolymer in aqueous dispersion in such a manner as to exhibit a gradient in hydrophobicity in a direction normal to the direction of ion transport through the cell. The fibrous carbon substrate is further treated with a mixture layer comprising the same aqueous dispersion, and exhibiting a similar gradient in hydrophobicity. The entire structure is subject to heating to 380° C. to coalesce the polymer.

Dirven et al, U.S. Pat. No. 5,561,000, discloses a bilayer structure in which a fine pore layer consisting of PTFE and carbon is deposited by coating onto a PTFE-treated carbon paper or fabric.

The MEAs to be recycled in accordance with this invention contain polymer membranes or fluorocarbon-containing ionomer membranes known in the art. In particular, fuel cells which contain perfluorosulfonate membranes such as Nafion® from Dupont can be readily treated in accordance with the teachings of the invention. Examples of perfluorosulfonate ionomers which can be used for membranes in the PEM fuel cells, and the membrane electrode assemblies which can be treated in accordance with the present invention are disclosed in U.S. Pat. Nos. 4,433,082 and 6,150,426, assigned to E.I. Dupont de Nemours and Co., as well as U.S. Pat. No. 4,731,263, assigned to Dow Chemical Co, each of which is herein incorporated by reference in its entirety. Other fluorocarbon-containing ionomers such as those containing carboxylate groups are being marketed and can be treated in accordance with this invention.

In accordance with this invention, the membrane electrode assembly is contacted with a solvent composed of at least one lower alkyl alcohol, preferably mixed with water. It has been found that the ratio of alcohol to water and the selection of the alcohol is dependent on whether or not the membrane is aged. In the case of membranes that have been aged, an alcohol-poor solvent mixture is preferably used. An alcohol-pool solvent may be considered as an alcohol and water solvent containing less than 30 wt % alcohol, however, less than 25 wt % alcohol is also exemplified.

In one embodiment, the 3-, 5-, or 7-layer MEA is shredded into small pieces (e.g., into 1×1 or ½×½ inch squares) and placed into a delamination tank containing a solvent in accordance with the present invention. This method may be preferred, as mechanical removal of layers, especially the gas-diffusion layers, tends to result in lower recovery of noble metal catalysts. Upon contact with the solvent, it has been found that the fuel cell membrane and the anode and cathode layers, which contain a supported noble metal, are separated. The cathode and anode often are in fine particles (more than 90% of the particles<50 microns) or coarse particles (greater than 50 microns) of carbon, which contains the supported noble metal catalyst. It is preferred that the catalyst layer (the anode and cathode) remain in coarse particles. If separated as fine particles that readily disperse in the solvent, recovery of noble metals may be made more difficult. The polymer membrane is also separated from any outer layers and remains in the solution. Membrane electrode assemblies containing gas diffusion layers (e.g., a 5- or 7-layer MEA) contacted with a lower alkyl alcohol-containing solvent cause the gas diffusion layers and the membrane layers to separate from the catalyst layers. Subsequently, the solvent can be heated under mild heating conditions dispersing the polymer membrane as particles and allowing for recovery of both the membrane and noble metal catalysts without the need for combusting the membrane electrode assembly first into ash before recovery.

By the term "contacting," it is meant primarily that the membrane electrode assembly be immersed or suspended in the alcohol or alcohol/water solvent. Agitation of the solvent may be useful in providing uniform mixtures of the alcohol and water and in decreasing the time needed for separation of the membrane from the catalyst layers. It is also possible to continuously contact the MEA with a flowing stream of solvent such as a mist or more concentrated liquid spray. Further, the MEA can be maintained in an alkyl alcohol solvent vapor stream, which may include steam for a time sufficient for the membrane to be stripped from the catalytic layers.

The solvent which is used in the present invention will comprise at least one $C_1$ to $C_8$ alkyl or isoalkyl alcohol. Mixtures of two or more such lower alkyl alcohols can also be used. It has been found that the addition of 5 up to 95% by weight water facilitates the separation process. Water alone has been found insufficient to separate the membrane from the catalytic anode and cathode layers. In one embodiment, the alcohol will be a $C_4$ to $C_6$ alkyl alcohol, as the lower alcohols such as methanol, ethanol, and isopropanol have low flash points. However, $C_1$ to $C_3$ alkyl alcohols, including mixtures of same, are effective for noble metal separation from the polymer membrane. Additional water contents relative to the mixture of 10 to 90% by weight are useful, including water contents of 10 to 50 wt. %. Alkanols higher than 6 carbon atoms may not form a miscible mixture with water even under agitation, and may not be as useful. Contact time may vary depending on the particular assembly and the particular solvent utilized, but typically at least 10 seconds and up to 10 minutes contact time is sufficient to cause separation of the membrane from the catalyst layers. Preferably, times of 30 seconds to 3 minutes are achievable with the right set of parameters.

In accordance with the present invention, both the supported noble metal and polymer membrane from a membrane electrode assembly (MEA) can be recycled in a single process. Applicants have observed that with a new membrane, the membrane may be left intact after treatment with the alcohol/water solvent mixture of the present invention. However, with an aged membrane, the membrane goes through a series of changes, depending on the alcohol content. Recycling of an aged MEA may result in some degradation of the membrane. For example, with 5% alcohol, the aged membrane was observed intact, but some of the electrode catalysts remained on the membrane. At 25% alcohol content, the carbon and electrode catalysts was completely separated from the aged membrane, but the latter had formed a gel and/or hydrophobic layer as a partial emulsion.

Applicants have unexpectedly found that a polymer gel, created when recycling a used MEA membrane, can be dispersed relatively quickly as polymer particles in the alcohol/water solvent of the present invention under mild heating conditions. As used herein, "mild heating conditions" include heating the alcohol/water solvent to temperatures from about 50° C. to about 180° C. Heating the alcohol/water solvent to temperatures of from about 50° C. to about 150° C., or from 70° C. to about 100° C., or to about 70° C., are also exemplified. As such, it is possible to recycle and separate both the supported noble metal and the polymer membrane (e.g., Nafion®) of a membrane electrode assembly using a semi-continuous process. One embodiment, illustrated in FIG. 1, allows for recycling of a MEA membrane without preliminary removal of the anode and cathode layers or the gas diffusion layers (GDLs). The process can be run in a batch, semi-continuous, or continuous manner. Potentially, the outer gasket layers (e.g., of a 7-layer MEA) may also be left on the MEA. Other advantages of this process include:

(1) recycling and reuse of the alcohol/water solvent mixture;
(2) energy efficiency as a result of running the process at low temperature and pressure;
(3) improved safety resulting from the use of a propanol/butanol mixture;
(4) concurrent generation of a concentrated polymer stream and carbon particles impregnated with precious metal;
(5) improved PM recovery; and
(6) removal of the carbon particles from the polymer results in lower HF generation from downstream combustion of the carbon particles.

Referring to FIG. 1 a process 40 for recycling MEA assemblies is provided comprising a delamination tank 42, a microwave heater 46, a filter press 58 and an ultra-filtration system 66. The delamination tank 42 contains a screen 43, which divides the tank 42 into upper 41 and lower chambers 45. The delamination tank 42 further comprises a means of agitating or mixing the alcohol/water solvent to enhance delamination (represented herein by stirrer 50).

A 5- or 7-layer MEA membrane is first shred into small pieces and the pieces placed into the upper chamber of a delamination tank 42. The tank 42 can be filled with an alcohol/water solvent, in accordance with the present invention, and the solvent mixed or agitated within the tank, thereby separating the supported noble metal from the polymer membrane and/or GDL layers. The remaining GDLs can be removed from the delamination tank or separated from the carbon/polymer solution and sieved off. In one embodiment of the present invention the alcohol/water solvent comprises at least two alkyl alcohols, for example, the alcohol/water solvent may comprise isopropanol and butanol. The alcohol/water solvent used in the present embodiment can be adjusted based on the composition of the membrane electrode assembly being recycled and/or based on the presence or absence of additional layers, e.g., gas diffusion layers.

Subsequent to separation of the supported noble metal catalysts from the polymer membrane, the alcohol/water solvent containing both the supported noble metal catalysts and the polymer membrane is pumped from the delamination tank 42, via line 44, through a microwave heater 46, which is separate from delamination tank 42. The microwave heater 46 heats the alcohol/water solvent to an adequate temperature for dissolution of the polymer membrane as polymer particles in the alcohol/water solvent. Typically, the microwave heater 46 will heat the alcohol/water solvent to a temperature of between about 50° C. and 150° C.

To assist in separation of supported noble metal particles from dispersed polymer membrane particles, and to assist in separation of dispersed polymer membrane particles from the solvent, it is important to control the size of the dispersed polymer particles. For example, the polymer particles should be small enough to pass through a filter press 58 for trapping the supported noble metal catalysts and large enough to be separated out of the alcohol/water solvent by using an ultra-filtration system 66. One means to assist in controlling the polymer particle size involves continuously flowing the polymer contained in the alcohol/water solvent through a heater for dispersion of the polymer particles in the solvent under mild heating conditions. The alcohol/water solvent should remain in contact with the heater long enough to heat the solvent to a sufficient temperature for dispersion of the polymer membrane but not long enough to create dispersions of polymer particles too small for separation of the particles from the solvent. Preferably, the average particle size contains a radius of greater than 100 nm, 125 nm, 150 nm or 175 nm. It is also preferred that at least 90% of the particles contain a radius of less than 500 nm. To achieve the desired dispersion, residence time of the polymer solvent mixture through the heater should be from about 1 minute to about 30 minutes. Residence times of from about 2 minutes to about 20 minutes, from about 5 minutes to about 10 minutes, are also exemplified.

After dispersion of the polymer membrane in the solvent, the supported noble metal catalysts and the dispersed polymer membrane particles can be separated from the alcohol/water solvent and from each other, e.g., by using a filter press 58 and an ultra-filtration system 66. In another embodiment, other known method of filtration may be used, e.g., a micro-filtration system may be used to separate the supported metal catalysts from the dispersed polymer membrane particles. In one embodiment, the alcohol/water solvent is first pumped through a screen 54, via line 48, for removal of any remaining large polymer membrane particles and/or any possible GDL layer particles and then pumped through a filter press 58, via line 56, to trap the supported noble metal catalysts as a filter cake or sludge. The filter press 58 of the present invention, allows the smaller sized polymer membrane particles to pass through the filter press 58 with the bulk of the alcohol/water solvent as a permeate. The noble metal catalysts contained in the filter cake can be recovered by any known means in the art (represented herein by arrow 60). For example, the noble metal catalysts can be recovered by: (1) combustion of the carbon particles in open air; and (2) acid treatment of carbon, under ambient pressure or under pressure and high temperatures.

The permeate, from the filter press 58 is directed to an ultra-filtration system 66, via line 62. The alcohol/solvent containing the dispersed polymer membrane particles is directed through the ultra-filtration system 66, which traps the dispersed polymer membrane particles, thereby resulting in a constant stream of recovered and concentrated polymer (represented herein as arrow 68), as polymer particles. The remaining alcohol/water solvent can be directed back to the delamination tank 42, via line 70, for semi-continuous recycling of MEAs.

As will be well understood by one of skill in the art, the forgoing process for recycling of a membrane electrode assembly is meant to be illustrative only. Many alternatives are contemplated. The addition of further components and different configurations are well within the scope and spirit of the present invention. As would be well appreciated by one of skill in the art, many different alcohol/water solvent combinations, as well as a number of filtration systems can be used in the practice of the present invention. They disclosed processes for recycling of a membrane electrode assembly from PEM fuel cells are not intended in any way to limit the scope of the present invention.

EXAMPLES

Example 1

Experiments were carried out on aged 5-layer MEAs with intact GDLs to compare loss of platinum (Pt) on the polymer membrane and/or on the GDL using different concentrations of isopropyl alcohol, 1-butanol and 2-butanol, See Table 1. The sample size used was 1 inch×1 inch in 20 ml of solvent, and the solvent volume was variable, estimated at 20 to 30 mL.

As can be seen from Table 1, loss of Pt on the polymer membrane and GDL were typically minimized with higher concentrations of alcohol.

TABLE 1

Comparison of Pt Recovery from Aged MEAs by Solvent Delamination

| Solvent | Temperature | % Pt left on GDL | % Pt left on membrane |
|---|---|---|---|
| 50% isopropanol | 100 | 0.9 | 0.5 |
| 25% isopropanol | 100 | 1.0 | 1.0 |
| 10% isopropanol | 100 | 27 | 42 |
| 25% 2-butanol | 100 | 1.0 | 2.4 |
| 10% 2-butanol | 100 | 0.5 | 1.7 |
| 10% 2-butanol | 150 | 2.1 | 1.7 |
| 5% 2-butanol | 100 | 3 | 6 |
| 25% 1-butanol | 100 | <0.2 | <0.2 |
| 10% 1-butanol | 100 | 0.6 | 0.4 |

Example 2

Used MEAs were tested in a batch mode for total recovery of Pt using various alcohol concentrations and temperatures. Samples (as ½×½ or 1×1 inch squares) were placed into plastic bottles with solvent, as described. The samples were then heated to a desired temperature using a microwave heating device and incubated for 30 minutes without agitation.

TABLE 2

Comparison of recovery of Pt from aged MEAs

| Solvent | Temperature (° C.) | Yield (%) |
|---|---|---|
| 5% propanol | 150 | 84.2 |
| 10% propanol | 150 | 98 |
| 25% propanol | 150 | 96.6 |
| 5% propanol | 100 | 11.8 |
| 10% propanol | 100 | 30.4 |
| 25% propanol | 100 | 98.1 |
| 5% n-butanol | 150 | 94.5 |
| 10% n-butanol | 150 | 93.3 |
| 25% n-butanol | 150 | 94.9 |
| 5% n-butanol | 100 | 95.9 |
| 10% n-butanol | 100 | 98.9 |
| 25% n-butanol | 100 | 100 |

Example 3

Continuous

Used MEAs were tested in a batch mode for total recovery of Pt using various alcohol concentrations and temperatures. 1×1 inch samples were placed into plastic bottles with solvent, as described. After incubation the GDLs were separated from the carbon/polymer solution and sieved off. The solution was then pumped through a microwave heating device allowing for complete dispersion of the polymer. The solvent went from a translucent emulsion to a transparent dispersion. The carbon/noble metal (Pt) particles were separated from the dispersion using a filter press and the yield of recovered precious metal (Pt) quantified, see Table 3.

TABLE 3

Comparison of recovery of Pt from MEAs using a continuous process

| MEA | Solvent | Temperature (° C.) | Pt Yield (%) (based on residual Pt) |
|---|---|---|---|
| New | 25% n-butanol | 100 | 98.5 |
| Used | 25% n-butanol | 100 | 99 |
| Used | 25% n-butanol | 150 | 97 |
| Used | 25% n-butanol/ 5% 2-propanol | 150 | 98.8 |

What is claimed is:

1. A process for recycling a membrane electrode assembly from a PEM fuel cell, said membrane electrode assembly comprising a fluorocarbon-containing ionomer film and supported noble metal catalysts coated on at least one side of said film, wherein said process comprising the steps:

(a) contacting said membrane electrode assembly with a solvent containing at least one $C_1$ to $C_8$ alkyl alcohol for a time sufficient to separate said ionomer film from said supported noble metal catalysts;
(b) heating said solvent to a temperature sufficient for dispersing said ionomer film into polymer particles in said solvent; and
(c) separating said dispersed polymer particles from said supported noble metal catalysts.

2. The process of claim 1, wherein said membrane electrode assembly is contacted with said solvent in a bath containing said solvent.

3. The process of claim 2, wherein said solvent is heated by a heater separated from said bath comprising said membrane electrode assembly.

4. The process of claim 3, wherein said solvent flows through said heater with a residence time of from about 1 minute to about 30 minutes.

5. The process of claim 1, wherein said solvent is directed to a first system for separation of said supported noble metal catalysts from said solution creating a permeate containing said dispersed polymer particles.

6. The process of claim 5, wherein said first system is a filter press.

7. The process of claim 1, wherein said noble metal catalyst is recovered from said support by combustion of said support in open air, or acid treatment of said support.

8. The process of claim 5, wherein said permeate is directed to a second system for separation of said dispersed polymer particles from said solvent.

9. The process of claim 8, wherein said dispersed polymer particles contain a radius of greater than 100 nm and wherein at least 90% of the particles contain a radius of less than 500 nm.

10. The process of claim 8, wherein said second system is an ultra-filtration system.

11. The process of claim 8, wherein said solvent is recycled for use in step (a).

12. The process of claim 1, wherein said solvent comprises at least one $C_3$-$C_6$ alkyl alcohol.

13. The process of claim 1, wherein said solvent comprises a mixture of said alcohol and water.

14. The process of claim 1, wherein said solvent comprises a mixture of two alcohols and water.

15. The process of claim 14, wherein said alcohols are isopropanol and butanol.

16. The process of claim 1, wherein said process is a continuous process.

17. The process of claim 1, wherein said membrane electrode assembly further comprises gas diffusion layers placed against each coating of said supported noble catalysts.

18. The process of claim 17, wherein said membrane electrode assembly further comprises outer gasket layers placed against each coating of said gas diffusion layers.

19. The process of claim 1, wherein said temperature in step (b) is from about 50° C. to about 180° C.

20. The process of claim 1, wherein said temperature in step (b) is from about 70° C. to about 100° C.

* * * * *